Oct. 5, 1965  J. A. ROBERTS  3,209,579
GAS REFERENCE LEAK FOR LEAK DETECTOR EQUIPMENT
Filed Dec. 28, 1961  2 Sheets-Sheet 1
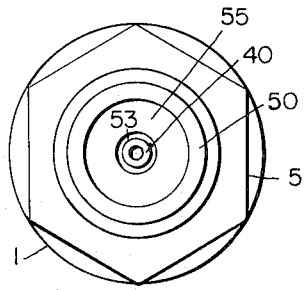
FIG. 2
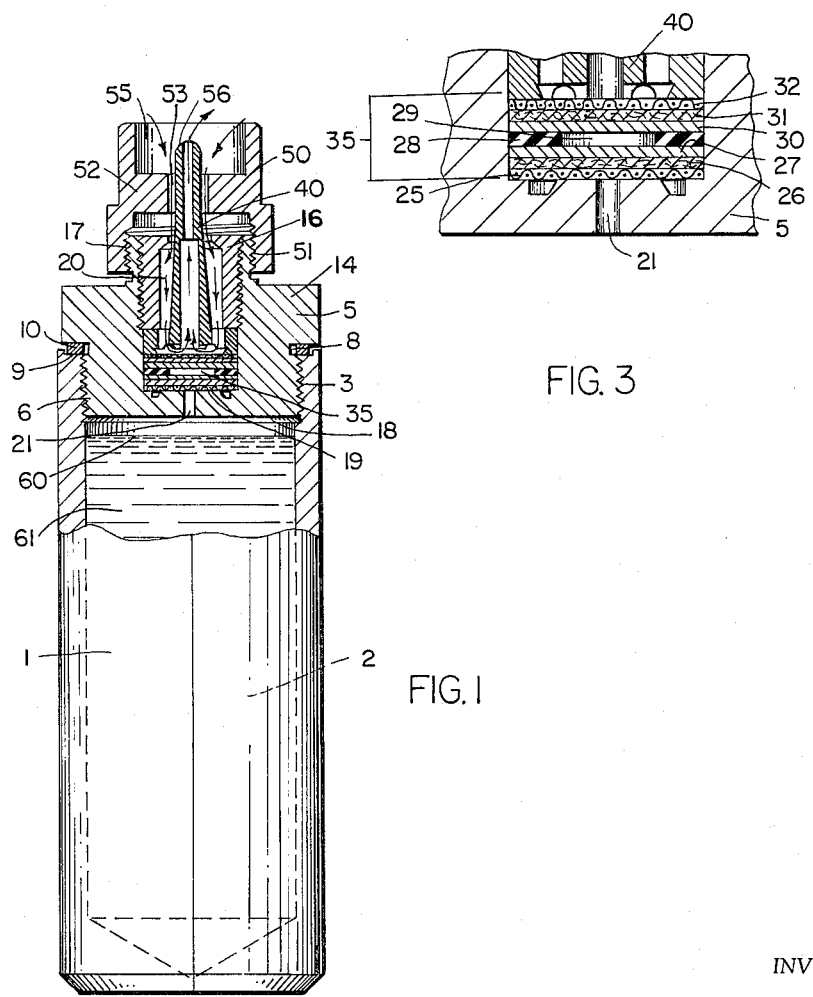
FIG. 3
FIG. 1
INVENTOR.
JOHN A. ROBERTS
BY
Irving M. Freedman
HIS ATTORNEY Oct. 5, 1965   J. A. ROBERTS   3,209,579
GAS REFERENCE LEAK FOR LEAK DETECTOR EQUIPMENT
Filed Dec. 28, 1961   2 Sheets-Sheet 2
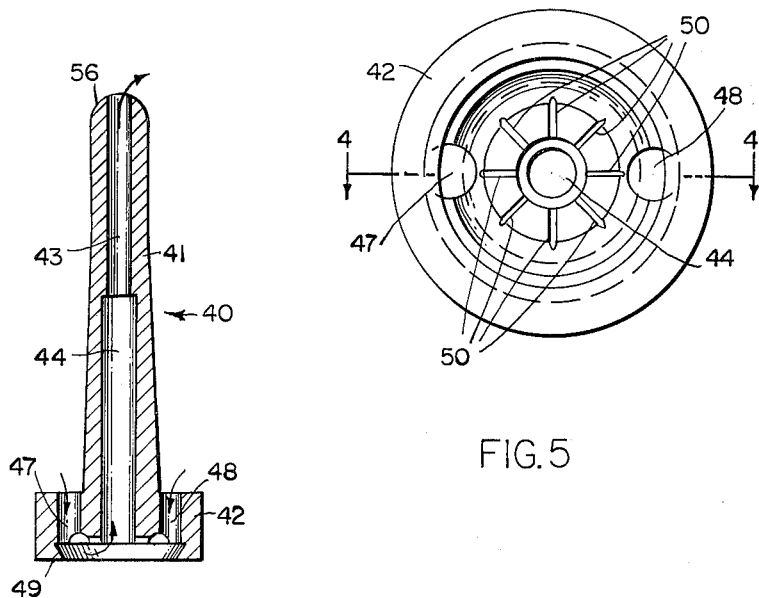
FIG. 4
FIG. 5
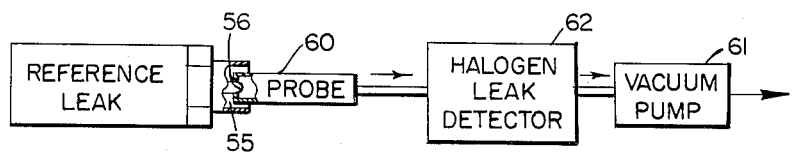
FIG. 6
INVENTOR.
JOHN A. ROBERTS
BY
Irving M. Freedman
HIS ATTORNEY

United States Patent Office 3,209,579
Patented Oct. 5, 1965

3,209,579
GAS REFERENCE LEAK FOR LEAK DETECTOR EQUIPMENT
John A. Roberts, Lynnfield Center, Mass., assignor to General Electric Company, a corporation of New York
Filed Dec. 28, 1961, Ser. No. 162,656
2 Claims. (Cl. 73—1)

The subject invention relates to a reference leak suitable for calibrating and/or testing electrical vapor or leak detector equipment of the type described in U.S. Patent 2,550,498, granted April 24, 1951 on application Ser. No. 754,657, filed June 14, 1947 by Chester W. Rice, and more particularly, to an uncomplex refillable reference leak utilizing a liquid to provide a gaseous leak.

The aforementioned patent, which is assigned to the same assignee as the present application, describes an arrangement for detecting the presence of certain substances or impurities in gases, such as halogen tracer gases, by passing the mixture between the electrodes of a sensitive element and noting variations in current flow between the electrodes due to variations in ion formation in the presence of the impurities or tracer gases. Such tracer gases may be introduced under pressure into closed systems and the exterior of the systems probed with the suction probe of the leak detector to detect the presence of tracer gases which leak through the container to indicate the presence and location of leaks. In evacuated systems, the detecting element or sensitive element may be located within the evacuated system and the exterior joints or areas suspected of leakage probed with a tracer gas.

In order to obtain a quantitative evaluation of the magnitude of a leak, the response of the detector to the tracer gas must be calibrated against a standard or reference leak of tracer gas. Also, in repairing or adjusting leak detector equipment it is necessary and/or desirable to utilize a reference tracer gas leak having a known magnitude.

Since the tracer gases most commonly employed for detecting leaks are of the halogen family, the apparatus has been commonly referred to as a halogen leak detector. Commercial forms of halogen leak detectors are very sensitive instruments and will provide an indication for leak rates as small as $\frac{1}{100}$ of an ounce per year.

Prior standard or reference leaks have for the most part been either of the complex, expensive, high-precision type or of a low-cost, nonrefillable type of relatively low accuracy.

It is an object of the present invention to provide a reference leak for supplying from a liquid reservoir predetermined minute quantities of a tracer gas or vapor for use in calibrating or servicing electronic leak detectors.

It is a further object of the present invention to provide an improved low-cost, liquid-reservoir reference leak which is uncomplex in structure and capable of being refilled.

It is another object of the present invention to provide an improved liquid-reservoir reference leak of relatively small size and weight and adapted for portable use.

Further objects and advantages of the invention will become apparent as the following description proceeds and the features of novelty which characterize the invention will be pointed out with particularity in the claims annexed to and forming a part of this specification.

In accordance with one form of the invention, a refillable, liquid-charge reference leak delivers a gaseous halogen reference leak output for testing and repairing halogen leak detectors. A liquid proof enclosure is adapted to contain a liquid charge which, when it evaporates, provides a tracer gas to which the leak detector is sensitive. A passageway leads from the interior to the exterior of the enclosure. A closure member in the passageway prevents the ready flow of, and becomes permeated by, the liquid charge. A gaseous reference leak tracer output is delivered by evaporation of the liquid at the outer surface of the permeated closure member. The permeation of the closure member and the gaseous reference leak rate are controlled to provide a predetermined desired reference leak.

More particularly, the closure member includes an annular member positioned between a pair of silicone rubber layers. The gaseous output is provided through an apertured nozzle which includes a base portion contiguous to the outer surface of the closure member. The base portion includes at least one aperture parallel to and spaced from the nozzle aperture and connecting the outer surface of the closure member with the outside of the enclosure. A plurality of radial slots in the side of the base portion contiguous to the outer surface of the closure member extend from the nozzle aperture with at least one slot connecting between the nozzle and base apertures.

For a better understanding of the invention, reference may be had to the following specification, taken in view of the accompanying drawings in which:

FIG. 1 is an elevational view, partially in cross-section, showing a reference leak incorporating the invention;

FIG. 2 is a top view without sectioning of the arrangement shown in FIG. 1;

FIG. 3 is an enlarged view of a portion of FIG. 1 showing in more detail the closure members in the passageway leading from the interior to the exterior of the leak standard; and FIG. 4 is an enlarged showing of the output member shown in FIG. 1;

FIG. 5 is a bottom view without sectioning of the output fitting of FIG. 4; and

FIG. 6 is a drawing in block diagram form illustrating the use of the reference leak in calibrating, testing, and/or repairing halogen leak detectors.

Referring to FIGS. 1 and 2, the enclosure or housing 1 is fabricated, for example, from one inch hexagonal type of aluminum rod drilled out to provide the axially extending central cavity 2 and having internal threads 3 at the open end. The open end of the enclosure 1 is closed by an assembly which includes a gland nut member 5 having external threads 6 along the lower portion thereof which cooperate with the internal threads 3 of the enclosure. A circumferential groove 8 is formed in nut 5 above the external thread 6. A mating groove or shoulder 9 is formed circumferentially about the interior edge of the end of the wall forming the open end of the enclosure 1. A washer 10 is interposed between the mating grooves 8 and 9 to provide a liquid and gas-tight seal.

The nut 5 may also conveniently be formed from one inch hexagonal aluminum stock so that the shoulder 14 of the nut above the circumferential groove 8 will be of the same diameter as the housing 1. The nut 5 includes a central axially extending portion 17 having internal and external threads. A central bore 20 extends from the portion 17 through the nut 5 almost to the bottom 18 of the nut in the region of the internal threads 3 forming an internal shoulder 19. A central axially extending passageway 21 connects between the central bore 20 and the interior or central cavity 2 of the enclosure 1. The passageway 21 may, for example, be in the order of .04 inch.

Seated upon the internal shoulder 19 of the central bore 20 is a multilayer member 35, shown in enlarged form in FIG. 3. Referring to FIG. 3, the multilayer member 35 includes in sequence: a noncorrosive support screen 25 fabricated, for example, of Monel metal having one hundred wires per inch; a paper member 26 of 100 percent ragboard, nonfilled, .015 inch thick, such as sold by Rogers Corporation, Rogers, Connecticut, as their type "Duro"; a silicone rubber member 27 three-sixty-fourths of an inch thick; a neoprene rubber washer or annular member 28 of .010 inch thick; a second silicone rubber member 30 similar to 27; a second paper member 31 similar to 26; and a second screen member 32 similar to 25.

Thus, the multilayer member 35 comprises a neoprene rubber washer 28 in the center sandwiched between successive layers of silicone rubber 27 and 30, paper 26 and 31 and screens 25 and 32. The screens 25 and 32 on the outside lend support and rigidity to the multilayer member 35, the function of which will be described in detail below.

Placed above the multilayer member 35 is the output fitting 40 also shown in FIGS. 4 and 5. Referring to FIGS. 4 and 5, it will be seen that the output fitting 40 includes an axially extending tapered conical section 41 supported by a radially extending base portion 42. An axial bore 43 extends partially through the conical section 41 and connects to an axial bore 44 of slightly greater diameter which extends through the base portion 42. A pair of diametrically opposed apertures 47 and 48 extend through the base 42 equally spaced from, and in a direction parallel to, the axis of the bores 43 and 44. Eight grooves 50 extend radially outward and perpendicular to the bore 44 along the bottom surface 49 of the base 42. At least two diametrically opposed grooves 50 connect to the apertures 47 and 48.

The output fittings 40 retains the multilayer member 35 against the internal shoulder 19 of the gland nut 5, and is in turn secured in place by a threaded cylindrical fitting 16 which cooperates with internal threads of nut 5. The probe fitting 50 as shown in FIGS. 1 and 2 includes internal threads 51 which cooperate with the external threads of portion 17 of the gland nut 5. A transverse portion 52 of fitting 50 surrounds, and is spaced from, the tapered conical portion 41 of the output fitting 40 providing axial passage 53 therebetween, and forms at the upper end a chamber 55 around the discharge end 56 of the output fitting.

All of the parts described above may be assembled independently of the enclosure 1 and washer 10 and subsequently secured to the enclosure after the enclosure is filled to a level 60 with a liquid such as the liquid refrigerant sold by E. I. du Pont de Nemours & Co. under the trademark of Freon-11, having a fomula of $CCl_3F$ and a relatively low boiling point of 23.7° C. at 1 atmosphere. The liquid when it evaporates or is vaporized provides a tracer gas to which the leak detector to be calibrated or tested is sensitive. The halogen-type of leak detector is particularly sensitive to members of the halogen family and vaporized Freon-11 contains halogen material. It will be seen that the level 60 of the liquid Freon 61 is slightly below the bottom 18 of the gland nut 5.

In operation the reference leak assembly is turned horizontal as shown in FIG. 6 so that the liquid charge 61 may contact the bottom 18 of the gland nut 5 and the multilayer member 35 becomes permeated by the liquid and may even become saturated. It is believed that the permeation occurs principally through a capillary type of action with the Freon being drawn successively through passageway 21, paper 26, silicone member 27, the aperture 29 of the neoprene washer 28, and thence through the silicone member 30 to the paper 31. The multilayer member 35, while preventing the ready flow of the liquid Freon therethrough, allows the action described above permeating the paper member 31. The paper members 26 and 31 lend support to the silicone members 27 and 30 which, when permeated or saturated with liquid Freon, become softened and may tend to swell and deform.

As indicated in FIG. 6 the probe 60 of the halogen leak detector system is positioned around the discharge end 56 of the subject reference leak and the vacuum pump 61 of the leak detector system draws the halogen gas present at the paper member 31 to the sensitive element of the halogen leak detector 62. As best illustrated in FIGS. 1 and 4, air from the atmosphere is drawn through the chamber 55 around the probe 60 to the axial passage 53 and then through the apertures 47 and 48 in the base of the output fitting 40 and past the screen 32 and paper 31 to act as a carrier to draw off halogen vapors provided by vaporization of the Freon at the paper 31. The rate at which the liquid Freon charge 61 replenishes that drawn from the multilayer member 35 and thus the output rate of halogen gas from the reference leak may be varied by selection of the size of the aperture 29 of the neoprene rubber washer 28 to control the leakage rate of the fluid past the aperture. A leak rate of up to one ounce per year may be provided in varying percentages thereof by varying the aperture 29 and by selection of the thickness and material of the layers of the multilayer member 35 such as the silicone members 27 and 30.

The steady predetermined flow of halogen gas which is provided to the halogen leak detector 62 is useful in adjusting, repairing or calibrating the leak detector. While the output leak rate provided by the equipment described above is not as accurate as that provided, for example, by the leak standard described in my U.S. Patent 2,981,091, issued April 25, 1961, and assigned to the same assignee as the present application, it is suitable for many applications and is less costly and more portable than the more accurate leak standard type of equipment.

Furthermore, the subject reference leak may be readily recharged by unscrewing the enclosure 1 from the gland nut 5 and replenishing the liquid Freon to provide a low cost leak indication having a relatively long life.

In addition, the subject reference leak does not appear to exhibit marked changes in output with variations in ambient temperature.

While particular embodiments of the subject invention have been shown and described herein, they are in the nature of description rather than limitation, and it will occur to those skilled in the art that various changes, modifications and combinations may be made within the province of the appended claims without departing either in spirit or scope from this invention in its broader aspects.

What I claim as new and desire to secure by Letters Patent of the United States is:

1. In a refillable liquid-filled reference leak of the halogen type providing a gaseous leak output for testing and calibrating halogen leak detectors: a liquid proof enclosure adapted to contain a liquid charge which when vaporized provides a gaseous tracer to which the leak detector is sensitive, a passageway leading from the interior to the exterior of said enclosure, a closure member closing said passageway, said closure member comprising a liquid permeable member, said passageway and said permeable member being oriented with respect to said enclosure so that said permeable member will become permeated by said liquid charge when the enclosure is positioned so as to bring said liquid into contact with the interior surface of said permeable member, an apertured nozzle for conducting the gas evaporating at the outer surface of said closure member to a point accessible to a probe of a leak detector to be calibrated, said nozzle including a base portion contiguous to said outer surface of the closure member having at least one aperture parallel to and spaced from said nozzle aperture said aperture in said base portion being in communication with the atmosphere so as to admit air which will carry the gas at said outer surface to said nozzle aperture when suction is applied to said nozzle aperture, said closure member further comprising an impervious annular member positioned in direct contact with a surface of said permeable member so as to control the effective area of said permeable member to provide a predetermined gaseous reference leak rate.

2. In a refillable liquid-filled reference leak of the halogen type providing a gaseous leak output for testing and calibrating halogen leak detectors: a liquid proof enclosure adapted to contain a liquid charge which when vaporized provides a gaseous tracer to which the leak detector is sensitive, a passageway leading from the interior to the exterior of said enclosure, a closure member closing said passageway, said closure member comprising a liquid permeable silicone rubber member, said passageway and said rubber member being oriented with respect to said enclosure so that said rubber member will become permeated by said liquid charge when the enclosure is positioned so as to bring said liquid into contact with the interior surface of said rubber member, an apertured nozzle for conducting the gas evaporating at the outer surface of said closure member, to a point accessible to a probe of a leak detector to be calibrated, said nozzle including a base portion contiguous to said outer surface of the closure member having at least one aperture parallel to and spaced from said nozzle aperture, said aperture in said base portion being in communication with the atmosphere so as to admit air which will carry the gas at said outer surface to said nozzle aperture when suction is applied to said nozzle aperture, said closure member further comprising an impervious annular member positioned in direct contact with a surface of said rubber member so as to control the effective area of said rubber member to provide a predetermined gaseous reference leak rate.

References Cited by the Examiner

UNITED STATES PATENTS 2,979,937   4/61   Chausson _____ 73—1

ISAAC LISANN, *Primary Examiner.*